United States Patent
Wu et al.

(10) Patent No.: US 11,048,904 B2
(45) Date of Patent: Jun. 29, 2021

(54) FINGERPRINT SENSOR EMBEDDED IN A FLAT-PANEL DISPLAY AND A METHOD OF OPERATING THE SAME

(71) Applicant: Himax Technologies Limited, Tainan (TW)

(72) Inventors: I-Lin Wu, Tainan (TW); Jia-Ming He, Tainan (TW); Yaw-Guang Chang, Tainan (TW)

(73) Assignee: Hirnax Technologies Limited, Tainan (TW)

( * ) Notice: Subject to any disclaimer, the term of this patent is extended or adjusted under 35 U.S.C. 154(b) by 32 days.

(21) Appl. No.: 16/592,657

(22) Filed: Oct. 3, 2019

(65) Prior Publication Data
US 2021/0103713 A1   Apr. 8, 2021

(51) Int. Cl.
*G06K 9/00*   (2006.01)
*H04L 9/32*   (2006.01)
*G06F 21/32*   (2013.01)
*G06F 3/041*   (2006.01)

(52) U.S. Cl.
CPC ............ *G06K 9/0002* (2013.01); *G06F 21/32* (2013.01); *H04L 9/3231* (2013.01); *G06F 3/0412* (2013.01)

(58) Field of Classification Search
None
See application file for complete search history.

(56) References Cited

U.S. PATENT DOCUMENTS

2018/0300527 A1* 10/2018 Wang .................. G06K 9/0004
2018/0317325 A1* 11/2018 Wu ........................ H05K 3/188

FOREIGN PATENT DOCUMENTS

CN            110174974 A      8/2019
WO    WO-2020019855 A1 *   1/2020

OTHER PUBLICATIONS

Office Action dated Jun. 30, 2020 in corresponding Taiwan Patent Application No. 108135976.

* cited by examiner

Primary Examiner — Joseph R Haley
(74) Attorney, Agent, or Firm — Donald E. Stout; Stout, Uxa & Buyan, LLP

(57) ABSTRACT

A fingerprint sensor embedded in a flat-panel display includes photo sensors; select transistors that are correspondingly connected in series with the photo sensors respectively; switch transistors that are correspondingly connected in series with the select transistors respectively, but are correspondingly connected in parallel with the photo sensors respectively; and a detection circuit that detects a signal passing one turned-on select transistor.

15 Claims, 3 Drawing Sheets

US 11,048,904 B2

FINGERPRINT SENSOR EMBEDDED IN A FLAT-PANEL DISPLAY AND A METHOD OF OPERATING THE SAME

BACKGROUND OF THE INVENTION

1. Field of the Invention

The present invention generally relates to a flat-panel display, and more particularly to a fingerprint sensor of a flat-panel display.

2. Description of Related Art

A mobile device, such as a smartphone, is a computing device small enough to hold and operate in the hand. The mobile device typically has a touchscreen that occupies substantial front surface (e.g., 70%) of the mobile device.

Modern mobile devices may have or be able to perform many functions adaptable to wide variety of purposes such as social interaction, financial transactions, and personal or business communications. With this concern, fingerprint is one of many forms of biometrics used to identify individuals and verify their identity in order to protect confidential or sensitive data stored in the mobile devices. Fingerprint recognition is not only a secure way of identifying individuals, but also a quick means for accessing the mobile device.

Many mobile devices (e.g., smartphones) have been equipped with fingerprint recognition, which is typically implemented with a physical button disposed on the front surface, for example, below and external to the touchscreen. Placing a fingerprint button on the front surface of the mobile devices is unfortunately in contradiction with the trend toward a bigger touchscreen that can accommodate more functions as the mobile devices become more powerful.

A flat-panel display, such as liquid crystal display (LCD), embedded with a fingerprint sensor is thus proposed. However, the performance of the conventional fingerprint sensor is low due to an associated low signal-to-noise ratio. A need has thus arisen to propose a novel fingerprint sensor with enhanced performance.

SUMMARY OF THE INVENTION

In view of the foregoing, it is an object of the embodiment of the present invention to provide a fingerprint sensor of a flat-panel display with increased signal-to-noise ratio and enhanced performance.

According to one embodiment, a fingerprint sensor embedded in a flat-panel display includes photo sensors, select transistors, switch transistors and a detection circuit. The select transistors are correspondingly connected in series with the photo sensors respectively. The switch transistors are correspondingly connected in series with the select transistors respectively, but are correspondingly connected in parallel with the photo sensors respectively. The detection circuit detects a signal passing one turned-on select transistor.

DETAILED DESCRIPTION OF THE INVENTION

Figure 1:
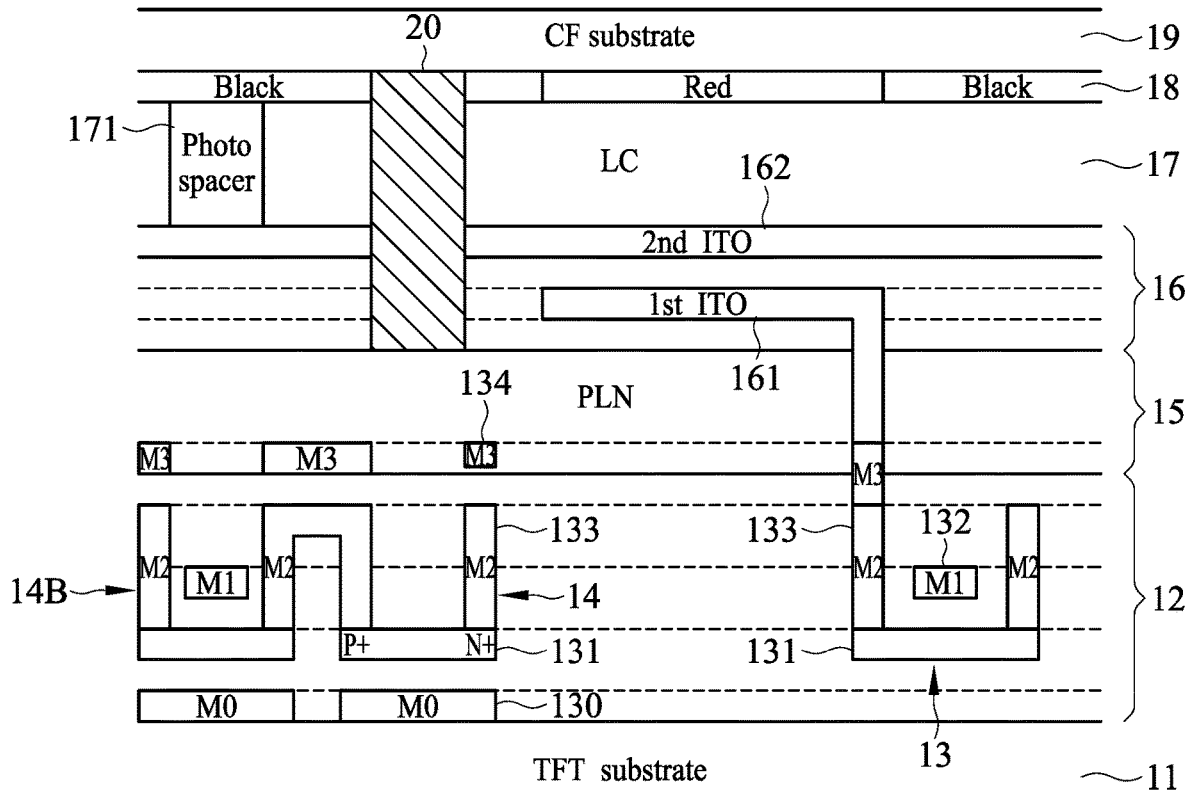
FIG. 1 shows a cross-sectional view of a flat-panel display embedded with a fingerprint sensor.

FIG. 1 shows a cross-sectional view of a flat-panel display such as a liquid crystal display (LCD) 100 embedded with a fingerprint sensor, which is integrated in an active area of the LCD 100. The LCD 100 may, for example, be a thin-film transistor (TFT) LCD. The TFT LCD is formed by using low-temperature polycrystalline silicon (LTPS) technique that is performed at relatively low temperatures (about 650° C. and lower) compared to traditional methods (above 900° C.). LTPS is important for manufacturing large-scale LCDs.

The LCD 100 may include a TFT substrate 11, upon which a first dielectric layer 12 is formed. The first dielectric layer 12 may, for example, be made of silicon oxide (SiO) and/or silicon nitride (SiN). A plurality of switch TFTs 13 for the purpose of display are formed in the first dielectric layer 12. Specifically, the switch TFT 13 may include a polysilicon (abbreviated as poly) layer (as a channel) 131, a first metal layer (as a gate) 132 disposed above the polysilicon layer 131, and a second metal layer (as source and drain) 133 disposed on the polysilicon layer 131 and enclosing the first metal layer 132, where the first metal layer (M1) 132 is insulated from the second metal layer (M2) 133 by the first dielectric layer 12.

At least one photo sensor (or photo detector) 14 is formed in the first dielectric layer 12. The photo sensor 14 may include the polysilicon layer 131 and the second metal layer 133 disposed on the polysilicon layer 131. The second metal layer 133 surrounds a passage, through which a light beam representing a fingerprint passes and is then detected by the photo sensor 14. The polysilicon layer 131 is doped with P-type dopants at one end, and is doped with N-type dopants at another end, thus forming a p-n junction acting as the photo sensor. Moreover, a base metal layer (M0) 130 disposed in the first dielectric layer 12 and on the TFT substrate 11 acts as a first light barrier to block or shield back light.

At least one select TFT 14B in companion with the photo sensor 14 is formed in the first dielectric layer 12. The select TFT 14B may include the polysilicon layer (as a channel) 131; the first metal layer (as a gate) 132 disposed above the polysilicon layer 131; and the second metal layer (as source and drain) 133 disposed on the polysilicon layer 131 and enclosing the first metal layer 132, where the first metal layer 132 is insulated from the second metal layer 133 by the first dielectric layer 12. The select TFT 14B is electrically connected to the corresponding photo sensor 14 by connecting respective second metal layers 133 together.

The LCD 100 may include a light source such as backlight module (not shown) disposed below the TFT substrate 11. The light source of the LCD 100 may emit a visible or invisible light beam.

The LCD 100 may include a transparent planarization (PLN) layer 15, with a substantially smooth top surface, formed over the first dielectric layer 12. The planarization layer 15 is made of a transparent material such as resin, through which light is allowed to transmit. At least one third metal layer (M3) 134 may be formed at the bottom of the planarization layer 15. The third metal layer 134 acts as a second light barrier to block or shield oblique light coming from directions other than the passage direction leading to the photo sensor 14.

The LCD 100 may include a second dielectric layer 16 formed on the planarization layer 15. The second dielectric layer 16 may, for example, be made of silicon oxide (SiO) and/or silicon nitride (SiN). At least one conductive layer is formed in the second dielectric layer 16. As exemplified in FIG. 1, the at least one conductive layer may include a first indium tin oxide (ITO) layer 161 formed at the bottom of the second dielectric layer 16 (e.g., formed on the planarization layer 15) and a second ITO layer 162 formed at the top of the second dielectric layer 16 (e.g., formed over the first ITO layer 161). The first ITO layer 161 is insulated from the second ITO layer 162 by the second dielectric layer 16. As shown in FIG. 1, the first ITO layer 161 may be connected to the second metal layer 133 of the switch TFT 13.

The LCD 100 may include a liquid crystal (LC) layer 17 formed over the second dielectric layer 16. At least one transparent photo spacer 171 is disposed in the LC layer 17 to isolate adjacent LC regions from each other. The photo spacer 171 of the LCD 100 may be made of a transparent material such as resin. The LCD 100 may further include a color filter (CF) layer 18 formed over the LC layer 17. The CF layer 18 is disposed on a bottom surface of a CF substrate 19. The CF layer 18 may include a plurality of color filters such as red, green and blue filters, through which red, green and blue lights can transmit, respectively. The CF layer 18 may also include at least one black filter, through which no light can transmit. The areas not covered by the black filter constitute a display area. As shown in FIG. 1, the black filter is substantially aligned with the underlying photo spacer 171. The photo sensor 14 is in an active display area not overlapping with a back filter of the CF layer 18.

The LCD 100 may include at least one lens region 20 disposed above and substantially aligned with the photo sensor 14 vertically. The lens region 20 is protruded upwards from, and connected to, a top surface of the planarization layer 15. The lens region 20 may include a transparent material, which may be the same as or different from the planarization layer 15. Specifically, the lens region 20 is elongated vertically and passes through, from bottom to top, the second dielectric layer 16, the LC layer 17 and the CF layer 18.

Figure 2:
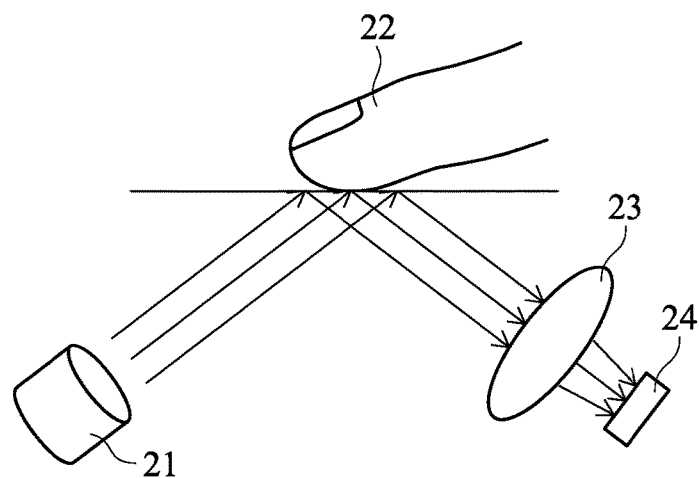
FIG. 2 shows a schematic diagram functionally illustrating the fingerprint sensor.

The LCD 100 as set forth above is embedded with a fingerprint sensor composed of the light source, the lens region 20 and the photo sensor 14. FIG. 2 shows a schematic diagram functionally illustrating the fingerprint sensor. Specifically, a light source 21 emits a light beam towards a finger 22. The lens region 20 acts as a rod lens 23 that focuses the light beam reflected from a fingerprint. The light beam representing the fingerprint is then detected by the photo sensor 14, which acts as a photo detector 24 that converts light into an electrical signal.

Figure 3A:
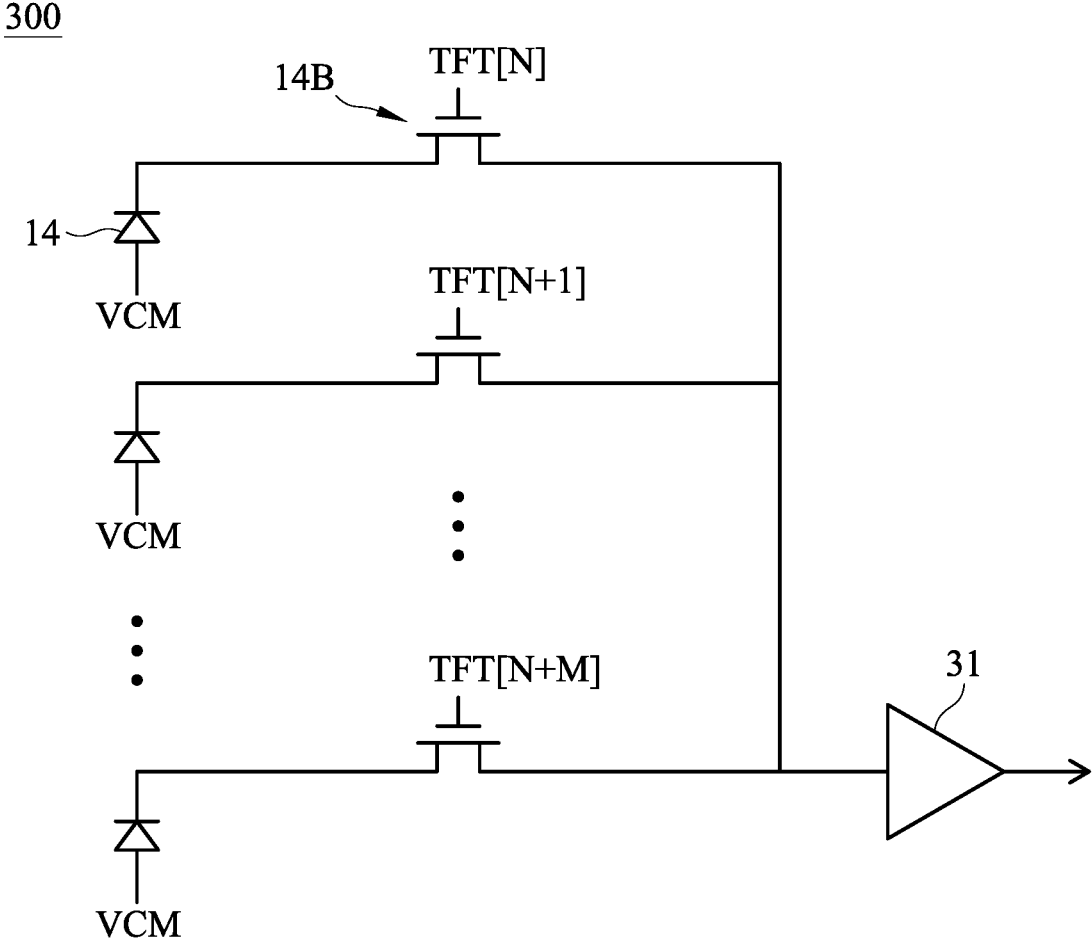
FIG. 3A shows a circuit diagram illustrating a fingerprint sensor embedded in the LCD of FIG. 1.

FIG. 3A shows a circuit diagram illustrating a fingerprint sensor 300 embedded in the LCD 100 of FIG. 1. The fingerprint sensor 300 may include a plurality of photo sensors 14 such as photo diodes. The fingerprint sensor 300 may include a plurality of select transistors 14B (such as select thin-film transistors (TFT[N]-TFT[N+M]) that are correspondingly connected in series with the photo sensors 14 respectively. Although N-type TFTs are exemplified in the fingerprint sensor 300, it is appreciated that P-type TFTs may be used instead.

The fingerprint sensor 300 may include a detection circuit 31 configured to detect a signal (e.g., a current) of one photo sensor 14 of a branch under detection. Specifically, a drain of the select transistor 14B may be electrically connected to a cathode of a corresponding photo sensor 14 (with an anode electrically, for example, connected to a common voltage VCM), and a source of the select transistor 14B may be electrically connected to an input node of the detection circuit 31.

Figure 3B:
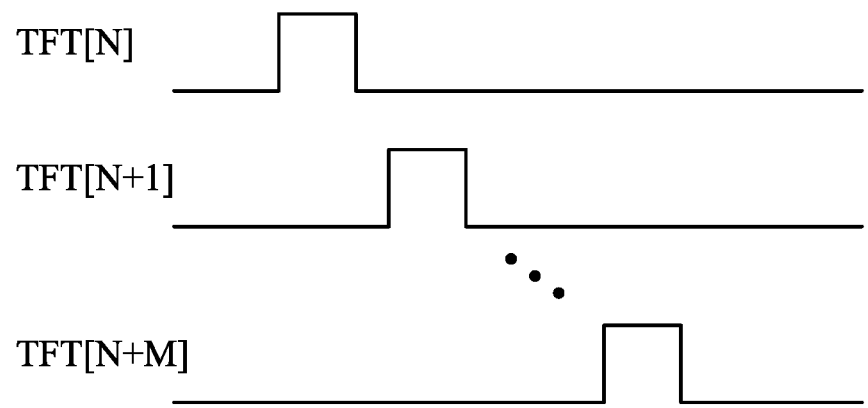
FIG. 3B shows timing diagrams illustrating control signals for correspondingly controlling gates of the select transistors respectively.

FIG. 3B shows timing diagrams illustrating control signals (TFT[N] to TFT[N+M]) for correspondingly controlling gates of the select transistors 14B respectively. As shown in FIG. 3B, only one of the select transistors 14B may be turned on at a time, and the select transistors 14B may be turned on in a predetermined sequence as exemplified in FIG. 3B.

It is noted that a turned-on select transistor 14B may generally have a few of kilo-ohms, and a turned-off select transistor 14B may generally have a few of mega-ohms. As the signal of the photo sensor 14 may generally have a current of a few of pico-amperes that are not large enough, and the turned-off select transistor 14B may have a resistivity of a few of mega-ohms that are not large enough, the detection circuit 31 may receive not only the signal passing the turned-on select transistor 14B but also the signals passing the turned-off select transistors 14B, thereby disadvantageously affecting a signal-to-noise ratio of the fingerprint sensor 300 and an associated performance.

Figure 4A:
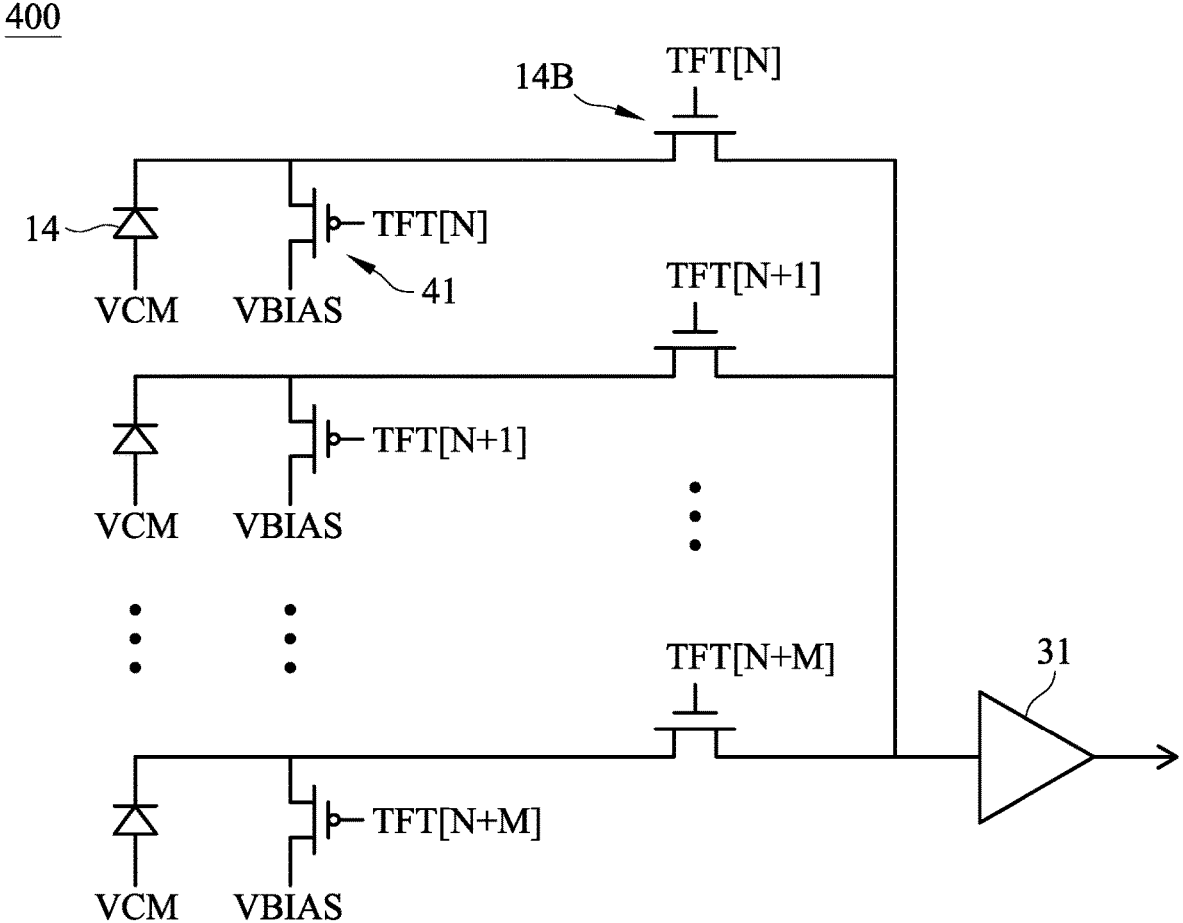
FIG. 4A shows a circuit diagram illustrating a fingerprint sensor embedded in a flat-panel display of FIG. 1 according to one embodiment of the present invention.

FIG. 4A shows a circuit diagram illustrating a fingerprint sensor 400 embedded in a flat-panel display such as the LCD 100 of FIG. 1 according to one embodiment of the present invention. The fingerprint sensor 400 of the embodiment may be similar to the fingerprint sensor 300 of FIG. 3A in architecture, and may include a plurality of photo sensors 14, a plurality of select transistors 14B and a detection circuit 31, details of which are omitted for brevity.

According to one aspect of the embodiment, the fingerprint sensor 400 may further include a plurality of switch transistors 41 (such as switch TFTs) that are correspondingly connected in series with the select transistors 14B respectively, but are correspondingly connected in parallel with the photo sensors 14 respectively. Although P-type TFTs are exemplified, it is appreciated that N-type TFTs may be used instead. In a preferred embodiment, the select transistors 14B may include N-type TFTs, and the switch transistors 41 may include P-type TFTs.

Specifically, a source of the switch transistor 41 is electrically connected to the drain of the corresponding select transistor 14B (and the cathode of the photo sensor 14), and a drain of the switch transistor 41 is electrically connected to a bias voltage VBIAS.

Figure 4B:
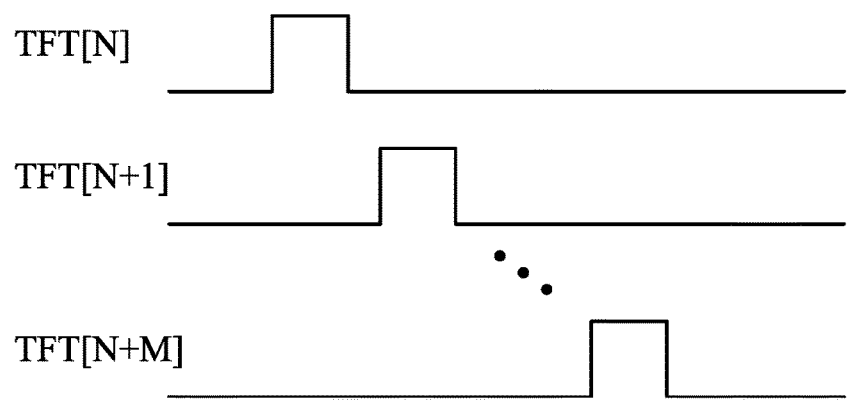
FIG. 4B shows timing diagrams illustrating control signals for correspondingly controlling gates of the select transistors respectively, and for correspondingly controlling gates of the switch transistors respectively.

FIG. 4B shows timing diagrams illustrating control signals (TFT[N] to TFT[N+M]) for correspondingly controlling gates of the select transistors 14 respectively, and for correspondingly controlling gates of the switch transistors 41 respectively. It is appreciated that, if N-type TFTs are used instead, the control signals for controlling the switch transistors 41 should have the inverse polarity of the shown waveforms.

According to another aspect of the embodiment, when the select transistor 14B is turned on, the corresponding switch transistor 41 may be turned off; when the select transistor 14B is turned off, the corresponding switch transistor 41 may be turned on. In other words, the switch transistor 41 may have a switching state (i.e., on or off) opposite to a switching state of the corresponding select transistor 14B.

Although the signal of the photo sensor 14 may have a current of a few of pico-amperes and the turned-off select transistor 14B may have a few of mega-ohms, the detection circuit 31 may receive only the signal passing the turned-on select transistor 14B but not the signal passing the turned-off select transistors 14B, thereby enhancing a signal-to-noise ratio of the fingerprint sensor 400 due to the turned-on switch transistors 41, and substantially enhancing performance of the fingerprint sensor 400.

Although specific embodiments have been illustrated and described, it will be appreciated by those skilled in the art that various modifications may be made without departing from the scope of the present invention, which is intended to be limited solely by the appended claims.

What is claimed is:

1. A fingerprint sensor embedded in a flat-panel display, comprising:
    a plurality of photo sensors;
    a plurality of select transistors that are correspondingly connected in series with the photo sensors respectively;
    a plurality of switch transistors that are correspondingly connected in series with the select transistors respectively, but are correspondingly connected in parallel with the photo sensors respectively; and
    a detection circuit that detects a signal of one turned-on select transistor;
    wherein the select transistor of a branch under detection is turned on and the switch transistor of the branch under detection is turned off, while the select transistors of all other branches not under detection are turned off and the switch transistors of all other branches not under detection are turned on; and a signal passing the turned-on select transistor of the branch under detection is detected by the detection circuit.

2. The fingerprint sensor of claim 1, wherein the switch transistor has a switching state opposite to a switching state of the corresponding select transistor.

3. The fingerprint sensor of claim 2, wherein when the select transistor is turned on, the corresponding switch transistor is turned off; when the select transistor is turned off, the corresponding switch transistor is turned on.

4. The fingerprint sensor of claim 1, wherein the flat-panel display comprises a liquid crystal display.

5. The fingerprint sensor of claim 1, wherein the photo sensor comprises a photo diode.

6. The fingerprint sensor of claim 1, wherein the select transistors comprise N-type thin-film transistors (TFTs) and the switch transistors comprise P-type TFTs.

7. The fingerprint sensor of claim 1, wherein only one of the select transistors is turned on at a time.

8. The fingerprint sensor of claim 1, wherein a drain of the select transistor is electrically connected to a cathode of the corresponding photo sensor, and a source of the select transistor is electrically connected to an input node of the detection circuit.

9. The fingerprint sensor of claim 1, wherein a source of the switch transistor is electrically connected to a drain of the corresponding select transistor and a cathode of the corresponding photo sensor, and a drain of the switch transistor is electrically connected to a bias voltage.

10. A method of operating a fingerprint sensor embedded in a flat-panel display, comprising:
    providing a plurality of branches each including a photo sensor, a select transistor and a switch transistor, the switch transistor being correspondingly connected in series with the select transistor but correspondingly connected in parallel with the photo sensor;
    turning on the select transistor and turning off the switch transistor of a branch under detection, while turning off the select transistors and turning on the switch transistors of all other branches not under detection; and
    detecting a signal passing the turned-on select transistor of the branch under detection.

11. The method of claim 10, wherein the flat-panel display comprises a liquid crystal display.

12. The method of claim 10, wherein the photo sensor comprises a photo diode.

13. The method of claim 10, wherein the select transistor comprises an N-type thin-film transistor (TFT) and the switch transistor comprises a P-type TFT.

14. The method of claim 10, further comprising electrically connecting a drain of the select transistor to a cathode of the corresponding photo sensor.

15. The method of claim 10, further comprising electrically connecting a source of the switch transistor to a drain of the corresponding select transistor and a cathode of the corresponding photo sensor, and electrically connecting a drain of the switch transistor to a bias voltage.

* * * * *